(12) United States Patent
Dau

(10) Patent No.: US 7,838,766 B2
(45) Date of Patent: Nov. 23, 2010

(54) SYSTEMS AND METHODS FOR STABILIZING CABLES UNDER HEAVY LOADING CONDITIONS

(75) Inventor: Mario Dau, Montreal (CA)

(73) Assignee: Paolo M. Dau, Los Altos, CA (US)

( * ) Notice: Subject to any disclaimer, the term of this patent is extended or adjusted under 35 U.S.C. 154(b) by 329 days.

(21) Appl. No.: 12/093,135

(22) PCT Filed: Nov. 9, 2006

(86) PCT No.: PCT/US2006/043814

§ 371 (c)(1),
(2), (4) Date: May 8, 2008

(87) PCT Pub. No.: WO2007/056581

PCT Pub. Date: May 18, 2007

(65) Prior Publication Data

US 2008/0277158 A1 Nov. 13, 2008

Related U.S. Application Data

(60) Provisional application No. 60/734,936, filed on Nov. 9, 2005.

(51) Int. Cl.
*H02G 7/04* (2006.01)

(52) U.S. Cl. .................... 174/40 R; 174/41; 174/45 R; 174/105 R; 174/99 R; 174/43

(58) Field of Classification Search ............... 174/40 R, 174/41, 43, 45 R, 99 R, 102 A, 102 R, 105 R; 333/236

See application file for complete search history.

(56) References Cited

U.S. PATENT DOCUMENTS

| 6,127,625 | A | * | 10/2000 | Castano | 174/40 R |
| 6,191,354 | B1 | * | 2/2001 | Castano et al. | 174/40 R |
| 6,204,445 | B1 | * | 3/2001 | Gialenios et al. | 174/40 R |
| 6,523,424 | B1 | * | 2/2003 | Hayes et al. | 73/862.391 |
| 7,687,710 | B2 | * | 3/2010 | Jachim et al. | 174/40 R |

* cited by examiner

*Primary Examiner*—Dhiru R Patel
(74) *Attorney, Agent, or Firm*—North Weber & Baugh LLP

(57) ABSTRACT

Systems and methods are disclosed for stabilizing a wire, cable (10), line, or cord system. The present invention involves systems that allow a cable (10), such as a power line cable (10) and the insulator strings (20), the ability to extend during loading conditions and to regain their previous geometry once loads, such as ice loads, have been shed. The present invention may be utilized in a number of applications, including but not limited to, being used with anchor, angle, and dead-end structures and with suspension structures to counterbalance loads on cables (10) and supports included by ice and wind. A combination of suspension structure with anchor structure and the present invention may, on any given section of a cable (10), result in uniformity of supports and in reduction of their weight and cost, in addition to providing reliability.

21 Claims, 4 Drawing Sheets

SYSTEMS AND METHODS FOR STABILIZING CABLES UNDER HEAVY LOADING CONDITIONS

This application is a U.S. National Stage Filing under 35 U.S.C. 371 from International Application Number PCT/US2006/043814, filed Nov. 9, 2006, and published in English as WO 2007/056581 A2 on May 18, 2007, which claims priority under 35 U.S.C. 119(e) to U.S. Provisional Application Ser. No. 60/734,936, filed Nov. 9, 2005, which applications and publication are incorporated herein by reference.

BACKGROUND

1. Field of the Invention

The present invention relates generally to the field of wire, cable, lines, or cord management, and more particularly to systems and methods for stabilizing wire, cable, line, or cord systems under heavy or variable loading conditions.

2. Background of the Invention

Cabling today is ubiquitous. As the number of applications and appliances that require some form of cable or wire connections increases, so does the amount of cabling. Such cabling may consists of electrical cabling to supply power to a device, a home, or an office. Cabling may also be used for data communication, such as, for example, wires for cable television, telephone lines, Internet access lines, and fiber optic cabling.

As society becomes ever more reliant on the services provided by cabling, whether it is simply providing power or providing some service such as telephone access, it becomes even more important that cabling systems be protected from failures. Failures in the cabling can occur as a result of stresses on the cabling. The stresses may result from mechanical or thermal changes. These failures are particularly more prevalent in cabling that resides in outdoor environments. Loading on the cable may occur due to strong winds or due to snow, ice, trees, or other items falling or resting on the cable.

Consider, by way of example, problems that occur for cables, such as power lines and telephone lines during ice storms. During ice storms, it is not uncommon that the accumulation of ice on such lines increases the tension in those lines to the point at which the lines break or the supporting structures upholding those lines collapse, leaving many people without electricity or telephone access. Not only do such broken lines deprive individuals of essential services, but finding and repairing those broken lines is time consuming and costly.

Prior solutions to dealing with increased loading on cables caused by abnormal weather conditions have focused on making the supporting structures heavier and more rigid. Unfortunately, in many cases that has not been sufficient to prevent the collapse of long sections of cables, resulting in catastrophic consequences to consumers and to suppliers. Conditions causing such failures can, nonetheless, be expected to arise anew, year after year.

Accordingly, what is needed are improved systems and methods of stabilizing wire, cable, line, or cord systems to withstand greater variations in loading.

SUMMARY OF THE INVENTION

According to an aspect of the present invention, systems and methods are disclosed for stabilizing wire, cable, line, or cord systems and their supports to withstand greater variations in loading. As used herein, the terms "cable" shall be construed to include, and may be used interchangeably with, the terms wire, cabling, line, cord, and the like.

An aspect of embodiments of the present invention is the replacement of rigidity, bulk, and weight, as used in prior solutions, with flexibility and adaptability by letting the sag of a cable increase between support structures in response to any load increases, and then by letting the cable regain its previous geometry, once these loads have subsided.

Exemplary embodiments of the present invention involve systems that impart to a cable the ability to extend during loading conditions and to regain its previous geometry once loads, such as ice loads, have been shed. The present invention may be utilized in any situation in which a cable, line, or cord may be subjected to variable loading conditions. Exemplary applications of the present invention include, but are not limited to, use of the present invention with anchor, angle, and dead-end structures and with suspension structures to counterbalance abnormal loads on cables and supports induced by ice and wind. In one embodiment, the use of teachings of the present invention will, in addition to improving reliability, contribute to the development of more uniform strains levels in those support structures, thereby leading to reductions in the weight and cost associated with the support structures.

In one aspect of the present invention, a system is provided for stabilizing a cable upheld by a support structure during transient loading conditions of the cable. The system may include a relief brake that carries from the support structure at least a portion of the weight of the upheld cable. The relief brake has a first end that is operably supported from the support structure, an opposed second end that is operably connected to the cable, and a brake body that is distensible in response to changes in the loading of the cable. Distension of the brake body affects the degree of sag in the cable. In embodiments, the brake body may be a telescoping structure, such as an hydraulic cylinder or a spring, that is operably connected between the support structure and the cable.

In another aspect of the present invention, a system for stabilizing a cable upheld by a support structure against transient loading conditions may include a guide frame secured to the support structure and a guide aperture in at least a portion of that guide frame. Slidably retained in the guide aperture is a follower. The follower and the guide aperture cooperate to permit and to affect motion of the cable relative to the support structure in response to changes in the loading of the cable. In one embodiment, the guide aperture may assume the form of an elongated travel slot elevated at an acute angle from the horizontal.

In the system, a relief brake may be employed to carry at least a portion of the weight of the cable being upheld from the support structure. An end of the relief brake may be mounted for sliding movement in the guide aperture. The relief brake may be a telescoping structure, and that telescoping structure may distend.

In yet another aspect of the present invention, a system for stabilizing a cable upheld by a support structure is provided with relief means operably connected between the support structure and the cable for affecting the sag of the cable in response to loading changes on the cable. The function of the relief means may be performed in one embodiment of the present invention by a telescoping structure, such as an hydraulic cylinder or a spring, that is operably connected between the support structure and the cable. Alternatively, in another embodiment of the present invention, the function of the relief means may be performed by a guide frame secured to the support structure in combination with a guide aperture formed in at least a portion of the guide frame. Slidably retained in the guide aperture is a follower. Together with the guide aperture, the follower permits and affects motion of the cable arising due to changes in the loading of the cable.

Although the features and advantages of the present invention are generally described in this summary section and the following detailed description section in the context of embodiments, it shall be understood that the scope of the present invention should not be limited to these particular embodiments. Many additional features, advantages, and fields of use will be apparent to one of ordinary skill in the art in view of the drawings and specification hereof.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE INVENTION

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. Furthermore, the appearance of the phrase "in one embodiment," "in an embodiment," or the like in various places in the specification are not necessarily all referring to the same embodiment.

Figure 1:
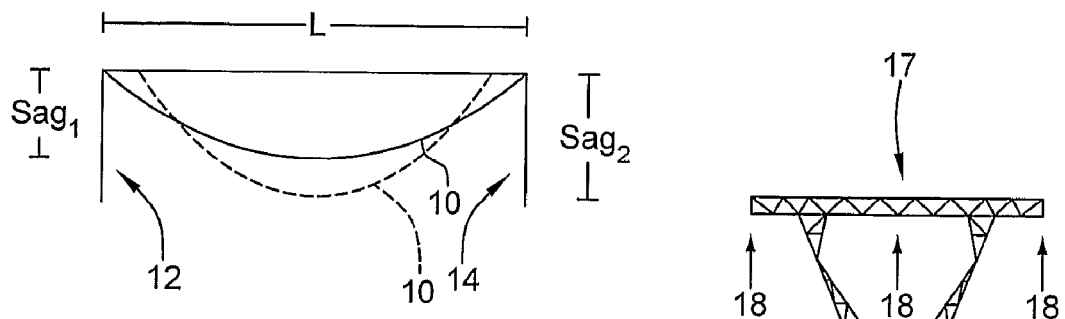
FIG. 1 is a diagram depicting principles of physics relevant to cables upheld between support structures.

FIG. 1 illustrates principles of physics relevant to a cable 10 upheld between a first support structure 12 and a second support structure 14. In order to keep under control the upward variation of tension on cable 10, it is sufficient either to decrease the span L of cable 10 or to allow the sagging of cable 10 to increase from $Sag_1$ to $Sag_2$. This principle is helpfully applicable according to teachings of the present invention to stabilizing cable 10 against failure under situations of increased tension, such as during transient conditions of heavy loading of cable 10.

Embodiments of the present invention involve systems that allow a cable, such as a power line, to increase in sag during transient conditions of heavy loading, and thereafter to regain its routine loading geometry once an intermittent heavy load has been shed from the cable. In one aspect of the present invention, this is accomplished through the use of a telescopic brake and/or through the gravity-driven interaction of mechanical components. Thus, the present invention prevents cable failures, thereby promoting the continuation of uninterrupted cable-delivered user services, such as the delivery of electric power or the transmission of telephone, television, or internet signals.

Figure 2:
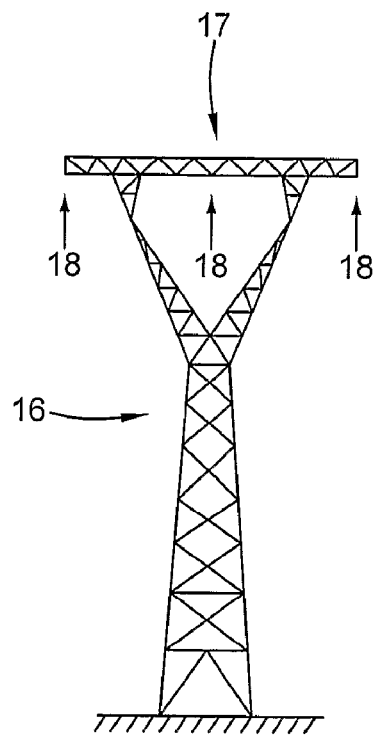
FIG. 2 illustrates an example of a support structure for upholding cables.

FIG. 2 is a diagram of a typical utility tower 16 used to uphold cables related to the distribution of electric power. Utility tower 16 is shown as an example of a support structure used to uphold cables, and is not to be considered as suggestive that the present invention finds applicability only or even primarily in that field. Utility tower 16 includes a horizontally disposed beam 17 upon which are situated one or more point connectors 18 from which a cable, such as cable 10, may be supported.

Figure 3A:
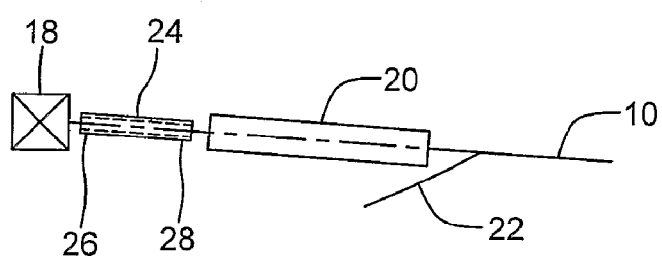
FIGS. 3A and 3B depict, respectively, an inactive state and an active state of a first embodiment of a system for stabilizing a cable embodying teachings of the present invention.
Figure 3B:
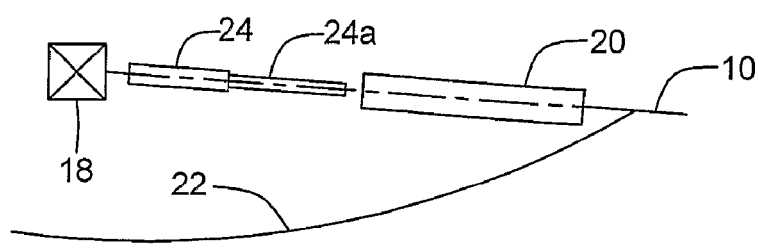

FIGS. 3A and 3B depict, respectively, an inactive state and an active state of a first embodiment of a system embodying teachings of the present invention for stabilizing cable 10 supported from beam point connector 18.

FIG. 3A depicts the inventive system in an inactive state during normal conditions of loading of cable 10. Cable 10 connects to an insulating string 20 and is electrically connected to a similar cable on the opposite side of beam point connector 18 by a jumper 22. Disposed between insulating string 20 and beam point connector 18 is a relief brake 24 that carries the weight of cable 10 to beam point connector 18. A first end 26 of relief brake 24 is operably connected to beam point connector 18, and thus to utility tower 16, while a second end 28 of relief brake 24 is operably connected through insulating string 20 to cable 10. The body of relief brake 24 between first and second ends 26, 28 thereof is distensible in response to increased loading of cable 10.

Thus, as depicted in FIG. 3B, when intermittent conditions of heavy loading conditions are imposed on cable 10, the length of relief brake 24 increases, revealing that the embodiment of relief brake 24 shown in FIGS. 3A and 3B is a telescoping structure include's within an outer casing a brake extension 24a. This distension of relief brake 24 advantageously affords to cable 10 an increase of the sag under such circumstances. Accordingly, relief brake 24 may be a hydraulic cylinder or a spring-loaded telescoping brake connected between beam point connector 18 of utility tower 16 and cable 10 to allow movement of cable 10.

Figure 4:
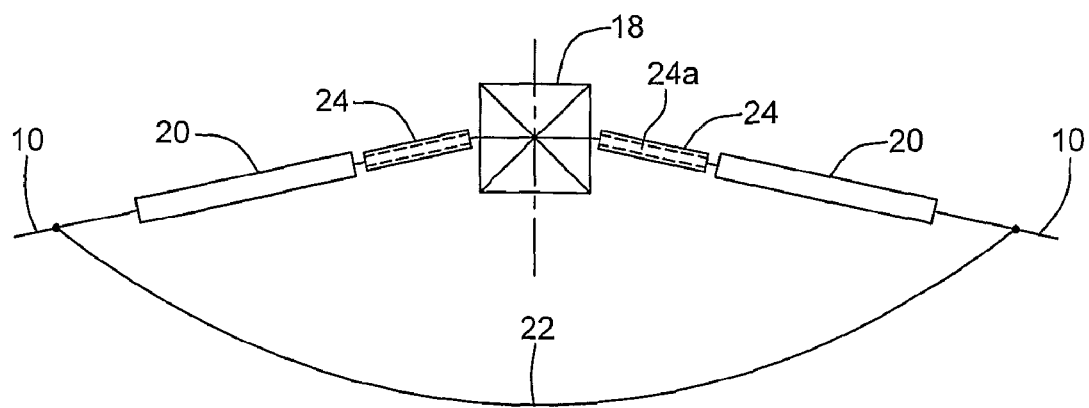
FIG. 4 depicts a second embodiment of a system for stabilizing a cable upheld by an anchor or angle support structure embodying teachings of the present invention.

FIG. 4 depicts an inactive state of a second embodiment of a system embodying teachings of the present invention in the system for stabilizing cable 10 upheld by an anchor or angle support structure with a support member represented in FIG. 4 by beam point connector 18. In the case illustrated in FIG. 4, on each side of beam point connector 18, a relief brake 24 is interposed between beam point connector 18 and a cable 10. Brake extension 24a is shown in dashed lines housed within the outer casing of relief brake 24.

As can be appreciated from FIG. 4, regardless of the specific implementation, one embodiment of the inventive system comprises a telescopic brake between a support structure and the cable that balances increasing cable loading, such as that encountered during ice formation the cable. The telescopic brake may be an hydraulic device or may contain one spring or a plurality of springs, or the like. As the loading on the cable increases, the telescopic brake extends in length. This increases the sag of the cable between the adjacent supporting structures. The telescoping system returns to the inactive state thereof once the condition of heavy loading has been eliminated. It should also be noted that, in embodiments, the present invention may act as or provide the added function of a shock absorber, should a sudden cable loading or unloading occur. One skilled in the art will recognize that the present invention may be utilized in a number of applications, including without limitation, with anchor, angle, and dead-end support structures.

Figure 5:
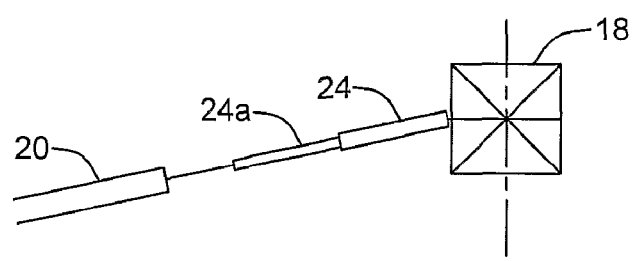
FIG. 5 depicts an active and an inactive state of a third embodiment of a system for stabilizing a cable upheld by a dead-end support structure embodying teachings of the present invention.

FIG. 5 depicts an active state of a third embodiment of a system embodying teachings of the present invention for stabilizing cable 10 when being upheld by a dead-end support structure that includes beam point connector 18.

Figure 6:
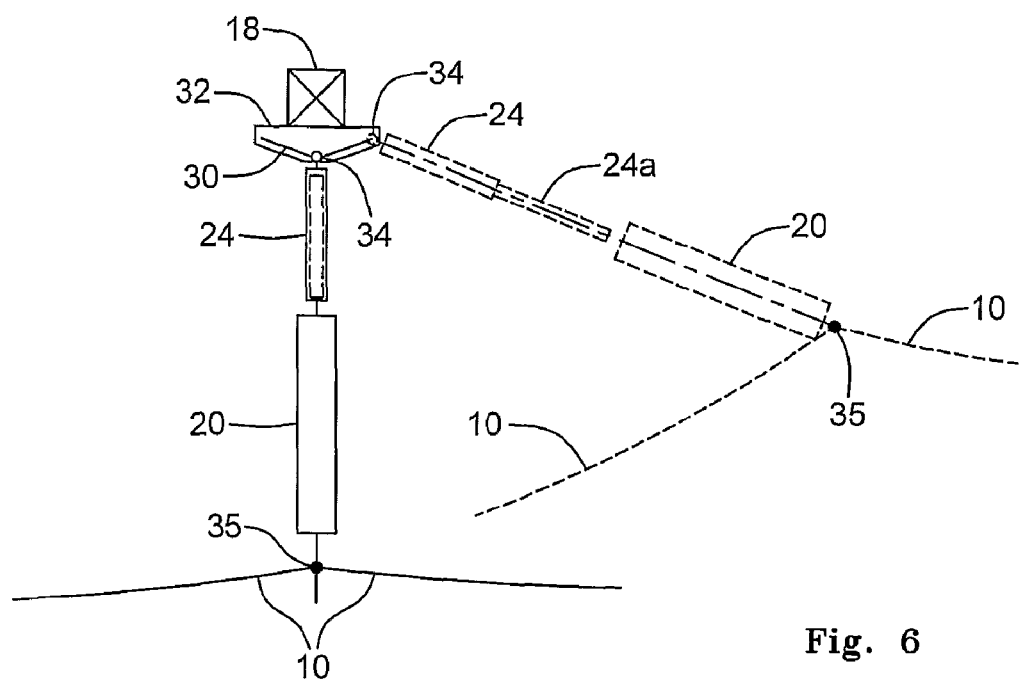
FIG. 6 depicts an active and an inactive state of a fourth embodiment of a system for stabilizing a cable upheld by a suspension support structure according to teachings of the present invention.

FIG. 6 depicts an active state and an inactive state of a fourth embodiment of a system for stabilizing cable 10 according to teachings of the present invention. The inactive state is shown in solid lines, and in the active state is shown in dashed lines.

In an embodiment, the system may allows relief brake 24, insulator string 20, and cable 10 to slide upwardly and horizontally, during transient conditions of heavy loading of cable 10. This manner of extension in the suspension structure of the system illustrated in FIG. 6 is accomplished due to a guide aperture 30 formed in a guide frame 32 that is rigidly secured to beam point connector 18. A follower 34 secured to one end of relief brake 24 is retained for slidable movement in guide aperture 30. Guide aperture 30 is oriented as to permit this lateral motion in cable 10 relative to utility tower 16 during transient conditions of heavy loading on cable 10. In the depicted system, translation of cable 10 is conditioned, at least in part, by the geometry of guide aperture 30, and that geometry may be adjusted to attain various behaviors.

In an embodiment, relief brake 24 may distend when the system changes from an inactive to an active state. As illustrated in FIG. 6, in an embodiment, the system may be configured to undergo a combination of movement along guide aperture 30 and extension of relief brake 24. This translation combined with the extensive effect contributed by relief brake 24 has the advantages of being able to displace cable 10 without breaking, and then to return cable 10 to the initial position thereof, once an excess load has been shed therefrom.

Figure 7:
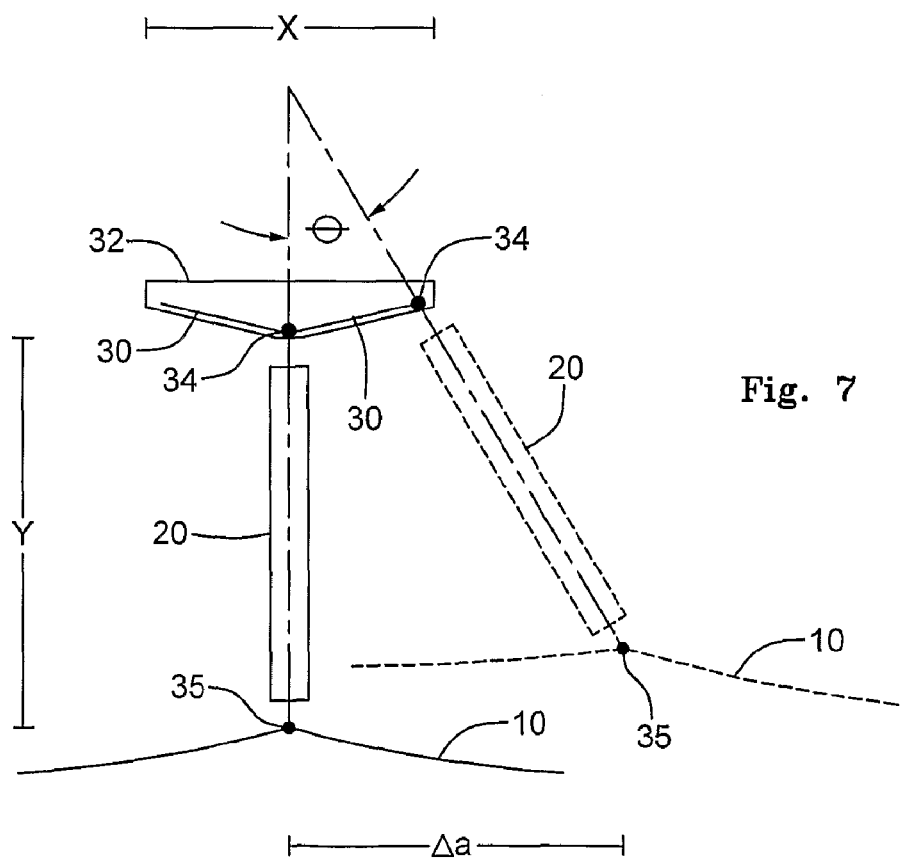
FIG. 7 depicts a fifth embodiment of a system for stabilizing a cable upheld by a suspension support structure according to teachings of the present invention.

FIG. 7 depicts a fifth embodiment of a system for stabilizing cable 10 according to teachings of the present invention that resembles the system of FIG. 6. An inactive state is shown in solid lines, and in an active state is shown in dashed lines. In an embodiment, guide frame 32 of the system may be a symmetric structure having a horizontal extent X. The distance Y between follower 34 and a connection 35 of insulator string 20 to cable 10 is invariant, because the illustrated system does not, like the system of FIG. 6, include a relief brake, such as relief brake 24. In an embodiment, the movement of the system of FIG. 7 may be depicted as a pivoting through an angle $\theta$. As indicated in FIG. 7, when transition between an inactive and an active state, cable 10 experiences a horizontal displacement indicated as $\Delta a$.

In the embodiment depicted in FIG. 7, it should be noted that as the system moves to an active state on one side of the support structure, the sag of the cable increases but the sag on the opposing side decreases. Such a configuration may be beneficial in many situations, including without limitation, for balancing stress between the cables or when one side of the cable receives a dramatic increase in loading. It should be noted, however, that the embodiment in FIG. 7 may be adapted for use in any configuration which has only one suspended incoming or one suspended outgoing cable, such as for example a dead-end structure. By using the present invention is such a configuration, the sag of the suspended cable may be affected without adversely affecting the opposing cable because it is not suspended to another support structure.

Figure 8:
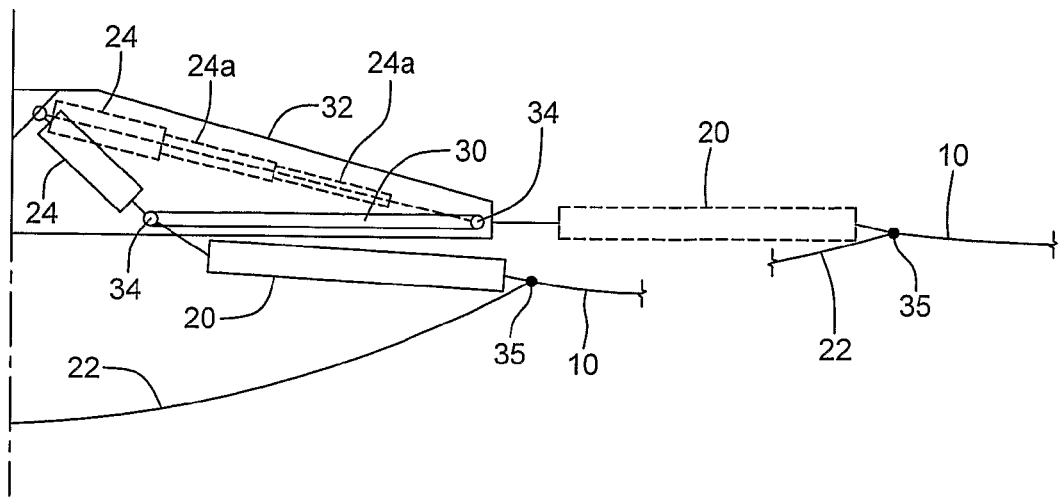
FIG. 8 depicts an active and an inactive state of a sixth embodiment of a system for stabilizing a cable according to teachings of the present invention.

FIG. 8 depicts a sixth embodiment of a system for stabilizing cable 10, when cable 10 is subjected to variable loading conditions. Inactive and active states of the system are shown, the latter in dashed lines. As depicted, guide frame 32 may include an outer wall or housing to restrict motion of relief brake 24. As relief brake 24 extends, follower 34 attached thereto slides laterally in guide aperture 30 formed by guide frame 32. One skilled in the art will recognize that the configuration of guide frame 32 affects the motion of relief brake 24, but may also provide supplemental support, for example, to counterbalance recoil, once an intermittent heavy loading condition on cable 10 has been alleviated.

Figure 9:
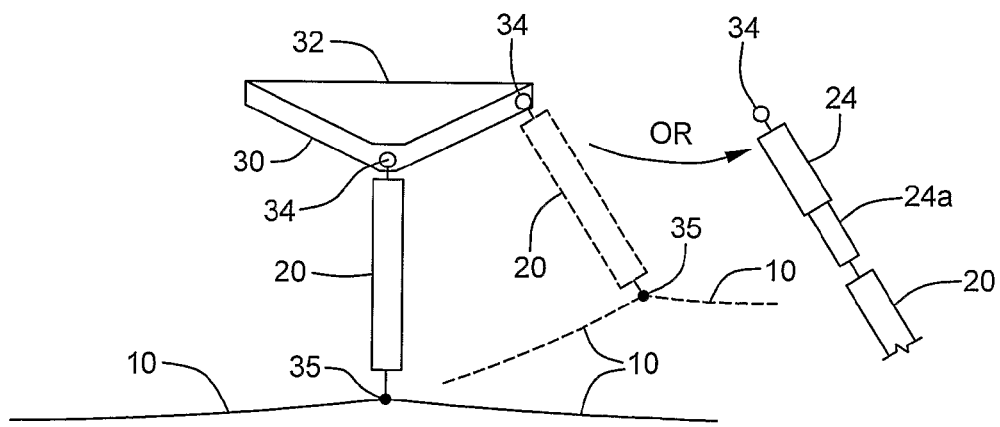
FIG. 9 depicts an active and an inactive state of additional embodiments of systems for stabilizing a cable according to teachings of the present invention.

FIG. 9 depicts embodiments of systems for stabilizing cable 10 according to teachings of the present invention, either with or without a relief brake, such as relief brake 24. Inactive and active states of the system are shown, the latter in dashed lines.

It shall be noted that embodiments of the present invention may or may not be used with a jumper. For example, embodiments depicted in FIGS. 6-9 do not wire the use of a jumper. It shall also be noted that when two items are referred to as being "carrying from," "connected to," "secured to," "connect between," "coupled to," "operably coupled," "operably connected," and the like, they are not required to be directly connected. Rather, the items may be connected via one or more intermediary connections. For example, a cable may be connected to a relief brake wherein an insulator is connected between the cable and the relief brake. It shall also be noted that in embodiments, relief brake 24 may be made of non-conducting materials and may, therefore, serve as an electrical insulator to insulate a support structure from a cable.

One skilled in the art will recognize that a combination of the embodiments described above may be employed to reduce failures, even under severe loading conditions. An embodiment of the present invention may include the combination of a telescopic brake with a suspension structure extension. One skilled in the art will recognize that such a configuration would be able to stabilize a section of a cable even under very heavy loading conditions. In an embodiment, the combined configuration may be arranged such that one of the telescopic brake and the suspension structure extension initiates before the other. For example, follower 34 on cable 10 may traverse guide aperture 30 before relief brake 24 begins to extend. In an alternative embodiment, both may be employed simultaneously.

One skilled in the art will recognize that the embodiments presented herein are presented to illustrate the invention. The present invention may be employed in any of a number of situations where a cable, line, cord, or wire experiences variable loading conditions and may be so modified to fit the application. For example, the present invention may employ frames of different sizes and different dimensions according to the particular application, such as varying power lines and supporting structures, to which they would be adapted in order to be properly restrained under static or dynamic loads.

It is possible that a particular section of a cable, especially in the cases of long spans between support structures on uneven ground, may be subject to a heavy load of such a magnitude as to cause such an increase in sag of a cable as will compromise normally maintained minimum ground clearance. If such a condition occurs, it is possible to limit the compromised ground clearance by erecting a pole topped with a cradle directly below the sag apex. If the cable is a power cable, the pole and cradle may be made of insulating material. This arrangement will decrease vertical and torsional loads on the support structures at either end of the cable span involved.

An embodiment of the present invention may include additional structures to respond to dynamic shock loading conditions. In an embodiment, the present invention may include one or more damping structures to minimize the effects of dynamic shocks. In an alternative embodiment, one or more of a damper, padding, and a universal joint or joints may be used to help control dynamic forces, such forces resulting from recoil or from strong winds. It should be noted that no specific implementation is critical to the present invention; accordingly, one skilled in the art will recognize that a number of systems may be used to prevent derailment of a track-mounted part or to limit the motion of a moveable part.

One skilled in the art will recognize that the present invention possesses a number of benefits. The present invention provides for the permanent, automatic control of loading conditions on cables subject to variable loading conditions. Because embodiments of the present invention automatically allows a cable to return to its original position following the termination of transient loading condition, no costly intervention is needed to reinstate the position of the cable. The configuration of the present invention does not result in eventual damage to cables due to frequent friction between cable and clamps during unusual loading conditions. The present invention not only results in better, more reliable services due to decreased cable failures, but also results in cost savings.

Embodiments of the present invention have been disclosed with reference to anchor, angle, dead-end, and suspension structures. One skilled in the art will recognize that the present invention is not limited to those uses, but may in addition be utilized in any situations in which a cable wire, line, cord, or the like is subjected to varying levels of loading. One skilled in the art will recognize that the present invention may be adapted for use with industrial and household equipment and appliances that possess cords or wires. It shall also be noted that the figures are provided by way of illustration only and shall not limit the present invention in any way, including limiting the present invention to those ranges or ratios. Furthermore, the present invention need not be symmetrically disposed.

While the invention is susceptible to various modifications and alternative forms, specific examples thereof have been shown in the drawings and are herein described in detail. It should be understood, however, that the present invention is not limited to the particular embodiments disclosed herein. Rather, the present invention is intended to include all modifications, equivalents, and alternatives falling within the spirit and scope of the present invention.

What is claimed is:

1. A system for stabilizing a cable upheld by a support structure during transient loading conditions, the system comprising a relief brake carrying from the support structure at least a portion of the weight of the cable upheld thereby, the relief brake having a first end operably supported from the support structure, an opposed second end operably connected to the cable, and a brake body between the first end and the second end and being distensible responsive to changes in loading of the cable.

2. A system as recited in claim 1, wherein the brake body is a telescoping structure.

3. A system as recited in claim 2, wherein the brake body comprises an hydraulic cylinder operably connected between the support structure and the cable to affect a sag of the cable.

4. A system as recited in claim 2, wherein the brake body comprises a spring operably connected between the support structure and the cable to affect a sag of the cable.

5. A system as recited in claim 1, wherein the first end of the relief brake is pivotably connected to the support structure.

6. A system as recited in claim 1, wherein at least one of the first and second ends of the relief brake is longitudinally slidably connected to the support structure.

7. A system as recited in claim 1, wherein the relief brake is connected to an insulator.

8. A system as recited in claim 1, further comprising a guide frame rigidly secured to the support structure and having an elongated travel slot, an end of the relief brake being mounted for sliding movement in the travel slot responsive to variable loading of the cable.

9. A system as recited in claim 8, wherein the brake body is enclosed in a housing rigidly secured to the support structure, and the guide frame forms a portion of the housing.

10. A system as recited in claim 1, wherein the relief brake insulates the support structure from the cable.

11. A system for stabilizing a cable upheld by a support structure against transient loading conditions, the system comprising:
    (a) a guide frame secured to the support structure; and
    (b) a guide aperture in at least a portion of the guide frame, the guide aperture slidably retaining therein a follower attached to the cable to permit motion of the cable relative to the support structure responsive to a changing in loading of the cable.

12. A system as recited in claim 11, wherein the guide aperture comprises an elongated travel slot elevated at an acute angle from horizontal.

13. A system as recited in claim 11, further comprising a relief brake and carrying from the support structure at least a portion of the weight of the cable, an end of the relief brake being mounted for sliding movement in the guide aperture.

14. A system as recited in claim 13, wherein the relief brake insulates the support structure from the cable.

15. A system as recited in claim 13, wherein the relief brake is a telescoping structure, and the telescoping structure distends when the end slides in the guide aperture.

16. A system for stabilizing a cable upheld by a support structure during transient loading conditions, the system comprising:
    (a) relief means operably connected to the support structure for affecting the sag of the cable responsive to loading changes of the cable; and
    (b) a connector operably connecting the relief means to the cable.

17. A system as recited in claim 16, wherein the relief means comprises a telescoping structure distensibly responsive to changes in loading of the cable.

18. A system as recited in claim 17, wherein the telescoping structure comprises an hydraulic cylinder operably connected between the support structure and the cable to affect the sag of the cable responsive to loading changes of the cable.

19. A system as recited in claim 17, wherein the connector includes an insulator and is operably connected to the telescoping structure.

20. A system as recited in claim 16, wherein the relief means further comprises:
    (a) a guide frame secured to the support structure; and
    (b) a guide aperture in at least a portion of the guide frame, the guide aperture slidably retaining therein a follower to permit motion of the cable relative to the support structure responsive to a changing in loading of the cable.

21. A system as recited in claim 20, wherein the connector includes an insulator and is operably connected to the follower.

* * * * *